(12) United States Patent
Parikh et al.

(10) Patent No.: US 11,238,117 B2
(45) Date of Patent: Feb. 1, 2022

(54) CUSTOMIZABLE ORDERING OF SEARCH RESULTS AND PREDICTIVE QUERY GENERATION

(71) Applicant: R2 SOLUTIONS, LLC, Frisco, TX (US)

(72) Inventors: Jignashu Parikh, Jamnagar (IN);
Harish Jaiprakash, Bangalore (IN);
Shyam Kapur, Sunnyvale, CA (US)

(73) Assignee: R2 Solutions, LLC, Frisco, TX (US)

( * ) Notice: Subject to any disclaimer, the term of this patent is extended or adjusted under 35 U.S.C. 154(b) by 73 days.

(21) Appl. No.: 16/041,918

(22) Filed: Jul. 23, 2018

(65) Prior Publication Data

US 2018/0365328 A1   Dec. 20, 2018

Related U.S. Application Data

(63) Continuation of application No. 13/034,982, filed on Feb. 25, 2011, now Pat. No. 10,061,853, which is a continuation of application No. 11/244,261, filed on Oct. 5, 2005, now Pat. No. 7,921,109.

(51) Int. Cl.
*G06F 17/00* (2019.01)
*G06F 16/9535* (2019.01)

(52) U.S. Cl.
CPC ................ *G06F 16/9535* (2019.01)

(58) Field of Classification Search
None
See application file for complete search history.

(56) References Cited

U.S. PATENT DOCUMENTS

| | | | |
|---|---|---|---|
| 6,434,556 B1* | 8/2002 | Levin | G06F 16/338 |
| 6,567,812 B1 | 5/2003 | Garrecht et al. | |
| 6,611,842 B1* | 8/2003 | Brown | G06Q 30/02 |
| 6,877,015 B1* | 4/2005 | Kilgore | G06Q 30/06 |
| | | | 707/700 |
| 6,898,586 B1* | 5/2005 | Hlava | G06F 16/313 |
| 7,240,287 B2 | 7/2007 | Qureshi et al. | |
| 7,523,099 B1* | 4/2009 | Egnor | G06F 16/9537 |
| 8,086,619 B2* | 12/2011 | Haahr | G06F 16/951 |
| | | | 707/765 |
| 2002/0152190 A1 | 10/2002 | Biebesheimer | |
| 2002/0198875 A1 | 12/2002 | Masters | |
| 2003/0097357 A1* | 5/2003 | Ferrari | G06F 16/954 |
| 2004/0027370 A1 | 2/2004 | Jaeger | |
| 2004/0093328 A1 | 5/2004 | Damle | |
| 2004/0133564 A1* | 7/2004 | Gross | G06Q 10/107 |
| 2004/0199498 A1* | 10/2004 | Kapur | G06F 16/951 |

(Continued)

*Primary Examiner* — Hasanul Mobin
(74) *Attorney, Agent, or Firm* — Noblitt & Newson PLLC

(57) ABSTRACT

In a computerized search system, a document corpus is searched according to a query and results of the search are presentable as an ordered search result set comprising one or more search hits, a search hit being a document of the document corpus or reference thereto. Based on content of the search result set, a number of suggested queries and/or parameter options are presented to a querier, thereby allowing the querier to select a suggested query and/or provide values for the parameters and those selections can be used to reorder the hits of the search result set. The particular suggested queries and/or parameters presented depend on the page elements of the search result set's documents and their categorization. The categorization might be done using concept networks.

16 Claims, 4 Drawing Sheets

(56) References Cited

U.S. PATENT DOCUMENTS

| | | |
|---|---|---|
| 2005/0154716 A1* | 7/2005 | Watson ................ G06F 16/951 |
| 2005/0171940 A1 | 8/2005 | Fogg et al. |
| 2005/0185860 A1 | 8/2005 | Denoue et al. |
| 2005/0216434 A1 | 9/2005 | Haveliwala et al. |
| 2005/0283473 A1 | 12/2005 | Rousso et al. |
| 2005/0289468 A1 | 12/2005 | Kahn et al. |
| 2006/0004734 A1 | 1/2006 | Malkin et al. |
| 2006/0026147 A1* | 2/2006 | Cone ................ G06F 16/9535 |
| 2006/0059442 A1 | 3/2006 | Bornstein et al. |
| 2006/0074883 A1 | 4/2006 | Teevan et al. |
| 2006/0085766 A1 | 4/2006 | Dominowska et al. |
| 2006/0218146 A1* | 9/2006 | Bitan ................ G06F 16/951 |
| 2006/0248078 A1 | 11/2006 | Gross et al. |
| 2007/0033171 A1* | 2/2007 | Trowbridge .......... G06F 16/337 |
| 2007/0179933 A1* | 8/2007 | Lee ........................ G06Q 30/02 |
| 2008/0040340 A1 | 2/2008 | Varadarajan et al. |
| 2008/0152231 A1 | 6/2008 | Gokturk et al. |
| 2008/0177640 A1 | 7/2008 | Gokturk et al. |

\* cited by examiner

CUSTOMIZABLE ORDERING OF SEARCH RESULTS AND PREDICTIVE QUERY GENERATION

CLAIM OF PRIORITY

The present application is a continuation of U.S. patent application Ser. No. 13/034,982 filed Feb. 25, 2011, which is a continuation of U.S. patent application Ser. No. 11/244,261, filed Oct. 5, 2005, which are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to searching a document corpus for documents, and more particularly relates to methods and apparatus for customized ordering of a document corpus search according to categorization of page elements of the search result set, possibly using user selection of query categories for further refinement.

BACKGROUND OF THE INVENTION

In a typical search system, a user using a client system issues a search query to search a document corpus and receives a set of search results via the client system. The search query may be issued from the client system to a search engine that is configured to search the document corpus, or an index thereof, for content that is relevant to the search query. The search engine may send a summary of the identified content in the form of a set of search results to the client system. The search results might include titles, abstracts, and/or links for the identified pieces of content. The search query and search results may be routed between the client system and the search engine over one or more networks, and by one or more servers coupled to the network. In many cases, the search results comprise many more hits than the querier can contemplate, so only the first few hits might be examined. Therefore, ordering search results is important as users perceive quality of search often by which hits are ordered first.

The network might be a local network, a global internetwork of networks, or a combination of networks. Common local networks in use today include local area networks (LANs), wide area networks (WANs), virtual LANs (VLANs) and the like. One common global internetwork of networks in use today is referred to as the Internet, wherein nodes of the network send the search query to other nodes that might respond with the search results relevant to the search query. One protocol usable for networks that include search systems is the Hypertext Transport Protocol (HTTP), wherein an HTTP client, such as a browser program operating on the client system, issues a query for search results referenced by a Uniform Resource Locator (URL), and an HTTP server responds to the query by sending search results specified by the URL. Of course, while this is a very common example, the issuance of a query and the sending of a set of search results relevant to the query are not so limited.

For example, networks other than the Internet might be used, such as a token ring, a WAP (wireless application protocol) network, an overlay network, a point-to-point network, proprietary networks, etc. Moreover, protocols other than HTTP might be used to request and transport search results, such as SMTP (Simple Mail Transfer Protocol), FTP (File Transfer Protocol), HTTPS (hypertext transfer protocol secure), etc. Further, content might be specified by other than URLs. It should be understood that references to the Internet can be substituted with references to variations of the basic concept of the Internet (e.g., intranets, virtual private networks, enclosed TCP/IP networks, etc.), as well as other forms of networks. It should also be understood that the operations might occur entirely within one computer or one collection of computers, thus obviating the need for a network.

Requested search results that are relevant to a query could be in many forms. For example, some search results might include text, images, video, audio, animation, program code, data structures, etc. The search results may be formatted according to the Hypertext Markup Language (HTML), the Extensible Markup Language (XML), the Standard Generalized Markup Language (SGML) or other language in use at the time.

HTML is a common format used for pages and other content that are supplied from an HTTP server. HTML-formatted content might include links to other HTML content and a collection of content that references other content might be thought of as a document web, hence the name "World Wide Web" or "WWW" given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

As described briefly above, a set of search results may include abstracts that identify documents that are relevant to a search query. The search results, however, may include a number of results that are not what the user had in mind when formulating a query (e.g., when formulating a query string). To locate the results the user had in mind, the user may review a number of the results, for example, by scrolling through the search results, which may be displayed as a Web page on the client system. If the search results are relatively lengthy, as is common, the user may become frustrated in attempting to locate the results that the user had in mind and might end their review of the search results. Alternatively, the user might issue another search query via their client system in an attempt to locate the search results the user had in mind.

If the query is well-understood by the search system and is unambiguous, it may be that an ordered presentation of the search results will present the most interesting (to that querier) documents first and less interesting documents later. Ordering can be important, as search results are often numerous enough that not all of the deemed relevant documents are presented in an initial display. The querier might scroll or page down to see more results, but is not likely to be interested in the results if it requires much scrolling/paging to find documents of interest.

What is needed is an improved search apparatus and method for generating search results and ordering them for user presentation, taking into account the nature of the query.

BRIEF SUMMARY OF THE INVENTION

In a computerized search system, a document corpus is searched according to a query and results of the search are presentable as an ordered search result set comprising one or more search hits, a search hit being a document of the document corpus or reference thereto. Based on content of the search result set, a number of suggested queries and/or parameter options are presented to a querier, thereby allowing the querier to select a suggested query and/or provide values for the parameters and those selections can be used to reorder the hits of the search result set. The particular suggested queries might depend on the categorization of the query and user selection of a category for the query, wherein the suggested queries are common queries for such categories. The particular parameters presented might depend on the categorization of the query taking into account similar factors and/or the page elements of the search result set's documents. The categorization might be done using concept networks.

According to a specific embodiment, the querier is a human. According to another specific embodiment, the querier is a computer.

Other features and advantages of the invention will be apparent in view of the following detailed description and accompanying figures.

DESCRIPTION OF SELECT EMBODIMENTS

Embodiments of the invention will now be described, by way of example, not limitation. It is to be understood that the invention is of broad utility and may be used in many different contexts.

Figure 1:
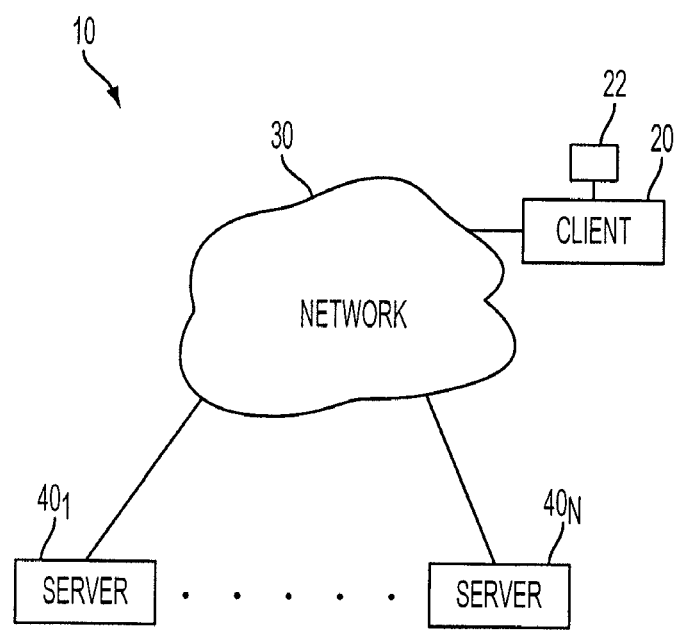
FIG. 1 is an illustration of an information retrieval and communication network that includes a client system according to an embodiment of the present invention.

FIG. 1 is an illustration of an information retrieval and communication network 10 including a client system 20 according to an embodiment of the present invention. In communication network 10, client system 20 is coupled through a network 30, such as the Internet and/or an intranet (e.g., a LAN or a WAN), to any number of server systems $40_1$ to $40_N$. As will be described herein, client system 20 is configured to communicate with any of server systems $40_1$-$40_N$, for example, to request, access, receive, retrieve, and/or display a set of search results. As referred to herein a set includes one or more elements.

Several elements in the system shown in FIG. 1 include conventional, well-known elements that need not be explained in detail here. For example, client system 20 might include a desktop personal computer, workstation, laptop, PDA (personal digital assistant), cell phone, any wireless application protocol (WAP) enabled device or any other computing device capable of interfacing directly or indirectly to the Internet. Client system 20 typically runs a browser program, such as Microsoft's Internet Explorer™ browser, Netscape Navigator™ browser, Mozilla™ browser, Opera™ browser, a WAP-enabled browser in the case of a cell phone, a PDA or other wireless device, allowing a user of client system 20 to access, process and view search results available to it from server systems $40_1$-$40_N$ over network 30. Client system 20 might also include one or more user interface devices 22, such as a keyboard, a mouse, a roller ball, a touch screen, a pen or the like, for interacting with a graphical user interface (GUI) provided by the browser on a display (e.g., monitor screen, LCD display, etc.), in conjunction with pages, forms, and other information provided by server systems $40_1$-$40_N$.

The present invention is suitable for use with the Internet, which refers to a specific global internetwork of networks. However, it should be understood that other networks can be used instead of or in addition to the Internet, such as an intranet, an extranet, a virtual private network (VPN), a virtual LAN (VLAN), a non-TCP/IP based network, any LAN or WAN or the like.

According to one embodiment, client system 20 and system servers $40_1$-$40_N$ and their respective components are operator configurable using an application including computer code run using one or more central processing units, such as those manufactured by Intel, AMD or the like. Computer code for operating and configuring client system 20 to communicate, process, and display search results relevant to a query is preferably downloaded and stored on a hard disk, but the entire program code, or portions thereof, may also be stored on any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $40_1$-$40_N$ to client system 20 over network 30 using a communication medium and protocols (e.g., TCP/IP, HTTP, HTTPS, Ethernet, or other conventional media and protocols). As referred to herein, a server system may include a single server computer or number of server computers configured to operate as a server system.

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 and/or servers $40_1$-$40_N$ or compiled to execute on client system 20 and/or servers $40_1$ to $40_N$. In some embodiments, no code is downloaded to client system 20, and needed code is executed by a server, or code already present at client system 20 is executed.

Figure 2:
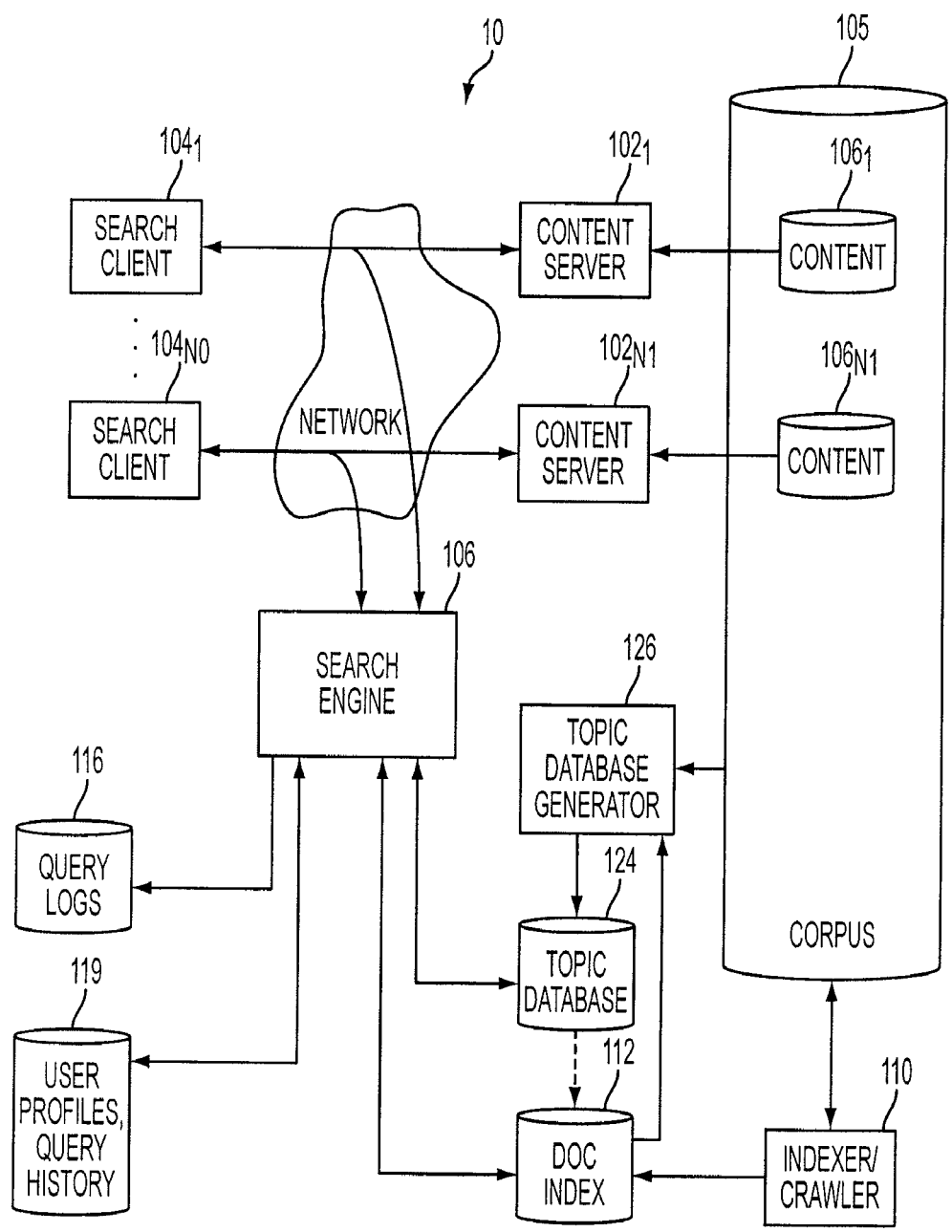
FIG. 2 is an illustration of the information retrieval and communication network shown in further detail according to one embodiment of the present invention.

FIG. 2 illustrates a search system 10 in greater detail. As shown there, search clients 104 are connected with content servers 102 that serve content 106 from a corpus 105. For example, search clients 104 might be computers with web browsers, content servers 102 might be web servers and content 106 might be repositories of web pages. Search clients 104 can also connect to a search engine 106 to identify content of interest. In an example operation, a search client 104 issues a search query to search engine 106, which returns search results to the search client and parameters usable for modifying presentation of the search results at the client system. Where the search results references content, the user of search client 104 can then access that content indexed by the search engine, by making a request to a relevant content server 102 that will return the content in response to the request.

Prior to searches being done, an indexer/crawler 110 would create a document index 112 for the corpus 105 to allow for searching over the content for relevant documents. Search engine 106 is coupled to this document index 112. Search engine 106 is also coupled to storage for a query log 116 and storage for user profiles 119 containing user preferences, demographics and possibly user query histories.

In operation, possibly millions of search clients send queries to search engine 106, which consults document index 112 and returns search results to the search clients. Search engine 106 also logs the queries in query log 116. The search results could be such that each of the hits refers back to search engine 106 or other server that tracks which search engine hits are selected, or the search results could point directly to the appropriate content server. Either way, the searcher typically responds to search results by following the links or references to one or more of the search hits. As explained below, additional presentation beyond just listing of results can be provided, such as a results-specific set of parameters to adjust and/or predictive queries for refining results.

Client System

According to one embodiment, a client application executing on a client system includes instructions for controlling the client system and its components to communicate with a server system to process and display data content received therefrom. The client application can be transmitted and downloaded to the client system from a software source such as a remote server system, although the client application can be provided on any software storage medium such as a floppy disk, CD, DVD, etc.

Additionally, the client application module includes various software modules for processing data and media content, a user interface for rendering data and media content in text and data frames and active windows, e.g., browser windows and dialog boxes, and an application interface for interfacing and communicating with various applications executing on the client. Examples of various applications executing on the client system invention include various e-mail applications, instant messaging (IM) applications, browser applications, document management applications and others. Further, the interface may include a browser, such as a default browser configured on the client system or a different browser.

In some embodiments, the client application provides features of a universal search interface. In some embodiments, separate windows are provided for separate display components or combines windows can be provided. For example, one window might provide ordered search results with scrolling capability, while another window provides sliders or other user interface devices to allow a user to vary weights of parameters specific to categorization of the documents that are listed.

Search Server System

Search engine 106 in one embodiment references various page indexes stored in document index 112 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure.

Search engine 106 may be configured with search related algorithms for processing and ranking web pages relative to a given query (e.g., based on a combination of logical relevance, as measured by patterns of occurrence of the search terms in the query; context identifiers; page sponsorship; etc.).

It will be appreciated that the search system described herein is illustrative and that variations and modifications are possible. The content servers and search engine may be part of a single organization, e.g., a distributed server system such as that provided to users by Yahoo! Inc., or they may be part of disparate organizations. Each associated database system may include multiple servers and associated database systems, and although shown as a single block, may be geographically distributed. For example, all servers of a search engine system may be located in close proximity to one another (e.g., in a server farm located in a single building or campus), or they may be distributed at locations remote from one another (e.g., one or more servers located in city A and one or more servers located in city B). Thus, as used herein, a "server" typically includes one or more logically and/or physically connected servers distributed locally or across one or more geographic locations; the terms "server" and "server system" are used interchangeably.

The search system may be configured with one or more page indexes and algorithms for accessing the page index or indices and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

In addition to returning search results, the search engine returns parameter settings. For example, if the search engine determines that the search results are about a particular topic, the search engine might return sliders specific to that topic to allow the user to refine the search at the client system. Alternatively, the parameter information might come from a separate system.

Topic Database Generator

In one embodiment, a topic database generator 126 populates a topic database 124 from a review of document index 112 and/or document corpus 105. The content of topic database 124 might be stored coincidentally with storage for document index 112 such that the topics and page elements for a given index page can be retrieved together. For example, topic database generator 126 might scan each document as it is indexed to identify page elements corresponding to topical features. As examples, topic database generator 126 might detect that a page contains content that is about a book and might also detect the title of the book, or might detect that a page contains content that is about a movie, sports, news or other topics commonly on the mind of users performing searches.

For each type of content, the topic database generator might determine, for each type of content, which queries are most appropriate and which parameters might be the most appropriate for user adjustments. If the content is about a particular consumer product, the parameters for user adjustment might be the user's preferred weights for purchase information, reviews, pictures, etc., while if the content is about a particular sports team, the parameters for user adjustment might be weights for team information, ticket sales, etc.

The topic database generator might also take into account time of day, location, etc. and other data points that might reflect on what the user's context is. For example, if the search results relate to movies and the user device is a cell phone, the interest might be more on directions to local theaters and ticket purchases, whereas a movie-related search at a desktop might be more on reviews, viewing previews and show times.

The topic database generator might use concept networks, relationships, and centroids of concepts to determine which queries are the most appropriate. Distance metrics in the concept networks might also be considered. For example, using a concept network, the topic database generator can determine that at a current time users are interested in reviews of a particular movie.

The information provided by the topic database generator can come in several forms. In one form, its output is in the form of suggested queries, wherein documents in the search results have been preprocessed to identify relevant page elements, which can then be associated with concepts in a concept network. Knowing the concepts, the document can be categorized according to the categorization of the concepts. Knowing the categorization, a set of suggested queries and/or parameters can be retrieved from the topic database such that documents are associated with suggested queries and parameters, which can then be provided to the end user with the search results. Alternatively, the topic of the query is found by categorization.

As an example, a client system might present the user with a listing of search result hits, ordered in a first order along with suggested queries and a user interface for user input of values for the parameters specific to those search results. The user can then select one of the search result hits, select one of the suggested queries to initiate a new search, or modify values for the parameters to cause a reordering of the search result hits. Alternatively, the user is presented with a list of categories for the current query and upon selecting a category, the user is presented with a set of suggested queries for the selected category. The suggested queries might be predicted from prior actions with such queries.

The client system might provide feedback to the search engine to indicate which of the options to user took.

While many variations of user interface elements are possible, one example used herein is that of sliders, wherein a slider represents a weighting of a parameters and the parameter is associated with a subconcept for a concept found in the search results. Thus, where a concept is identified in search results, concept-specific parameters would be presented, allowing the user to weight different subconcepts differently and have the client user interface modify search order of search results. In some cases, where practical, the reordering would occur at the server side. The sliders would each have titles so the user knew what subconcepts were being weighted. The particular subconcepts could be based on a concept network, rather than having a universal set of parameters or based on some manual assignment.

Figure 3:
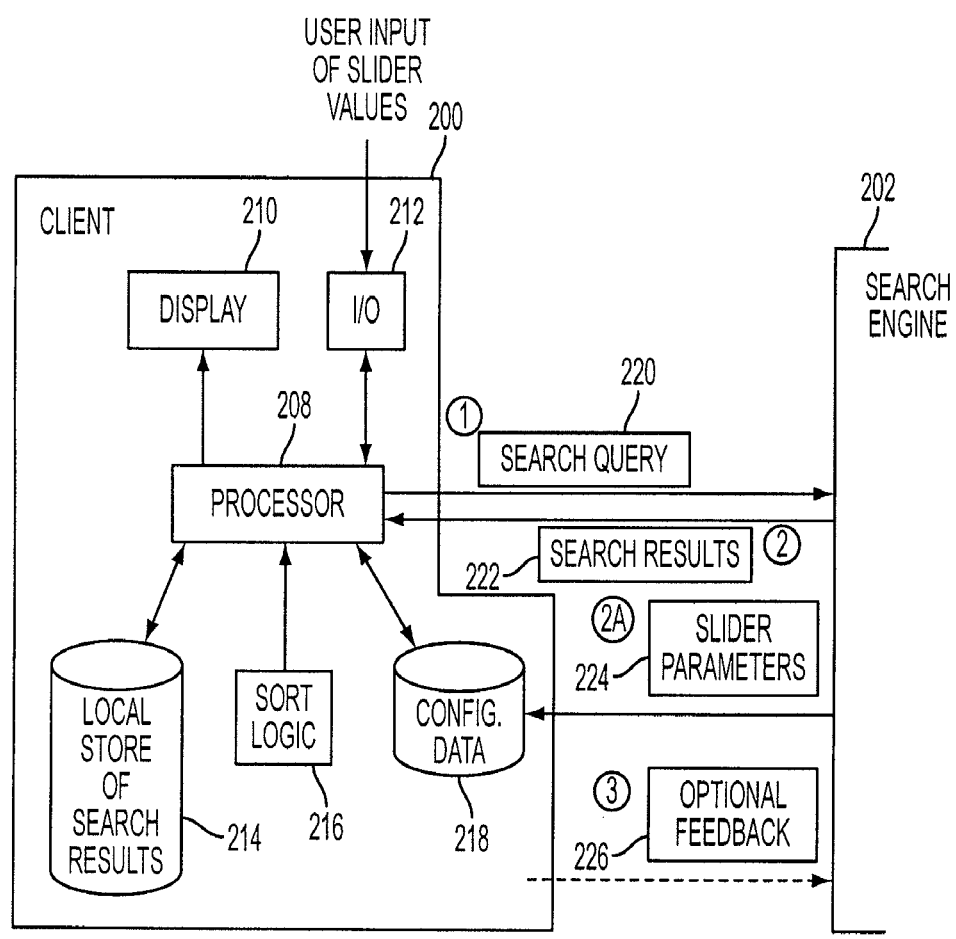
FIG. 3 is an illustration of the information retrieval and communication network shown in further detail including interaction of a client system and a search engine.

FIG. 3 is an illustration of the information retrieval and communication network shown in further detail including interaction of a client system 200 and a search engine 202. As shown, client system 200 comprises a processor 208 for handling operations, a display 210 and I/O 212 for user interface, a local store 214 for storing search results locally (if this option is used and search results are not stored and accessed server-side), sort logic 216 and storage for configuration data 218.

In a typical operation, processor 208 accepts user input to formulate a search query 220. One example of a formulation is to present the user with a web page having a place to enter a search query string, but other techniques might be used as well. Processor 208 then transmits search query 220 as a record of data to search engine 202, which processes the search query (and possibly other data, such as user context and the like) to arrive at search results 222, which typically comprise an ordered set of search hits, each deemed responsive to the query and possibly comprising a plurality of search hits numbering more than the user can be expected to use or review. The search results 222 are conveyed to client system 200, so that processor 208 can display a portion of them and store them in local store 214. Search engine 202 might also convey slider parameters 224 or other parameters that are dependent on the search results or the search query. Search engine 202 might also convey suggested queries that are dependent upon the search results.

The suggested queries might be selected as the more common tasks users perform with pages related to a particular category of the queries. For example, consider the query of a famous fictional character "Joe Smith" that happens to be the subject of several books and movies. The system first categorizes the query and determines that this query fits into the categories "books" and "movies". The system presents the user with an interface to select one of the determined queries. If the user chooses "books", the system will retrieve the most common tasks users do within this category and give the user suggestions that have embedded queries. For example, if the user selects "books", the system might suggest queries with labels such as "Book Reviews for Joe Smith" (for which the internal query can be <"Joe Smith" AND book AND (reviews OR review OR "critic review" OR "user review")>), "Get EBooks for Joe Smith" (for which the internal query can be <"Joe Smith" AND book AND (ebook OR ebooks OR "download book")>), whereas if the user selected the "movies" category, the suggested queries might include <"Joe Smith" AND ("movie show times" OR "movie details")>. Thus, the system determines, from a user query, suitable categories and suggests predictive queries that depend on which of the determined categories the user selects.

Processor 208 uses sort logic 216, which might be in the form of program instructions such as Javascript™ or Java' instructions downloaded from search engine 202. Sort logic 216 might include user interface elements that processor 208 would present to the user to allow the user to input desired values for the conveyed parameters and/or select a suggested query. Slider parameters 224 are stored into storage for configuration data 218 and can be accessed from there by processor 208.

In a specific example for illustrative purposes, search query 220 comprises the string "Tell me about Lorem Ipsum", search results 222 comprises search hits deemed related to the concepts that search engine 202 identifies in search query 220 and, as explained above, parameters 224 (and suggested queries, if used) are determined by search engine 202 from the identified concepts, so that they are relevant to the deemed intent of the user doing the search. For example, a concept network might show a strong link between the concepts "Lorem Ipsum" and "movie", leading to the conclusion that the user's intent is to find out information about a movie titled "Lorem Ipsum". Furthermore, using trend analysis, the search engine might also detect that because interest is rising quickly, this must be a newly released movie, so the user might be interested in a trailer, buying tickets, etc. Alternatively, if the search engine determines that this is not a newly released movie, it might infer that the user is interested in buying a copy of the movie for home viewing, such as a video or DVD, or that the user is interested in background of the movie. Thus, even the likely category the user would select can be guessed by the system, in which case the system would proceed to show the predicted queries for the guessed category.

Whatever search engine 202 infers, it can generate relevant subconcepts for presentation to the user, such as "Buying this Movie", "Viewing a Preview", "Actor List", etc. Processor 208 can present the subconcepts to the user and get from the user weights for subconcepts, as parameter values. These parameter values can then be used by sort logic 216 to reorder the search results stored in local store 214 and processor 208 can redisplay the search results in a different order. Thus, if the user heavily weights "Viewing a Preview", sort logic 216 might move hits up in the order that relate to the subconcept of "movie previews" and also relate to the concept of "movie" and the subconcept "Lorem Ipsum, the Movie".

Figure 4:
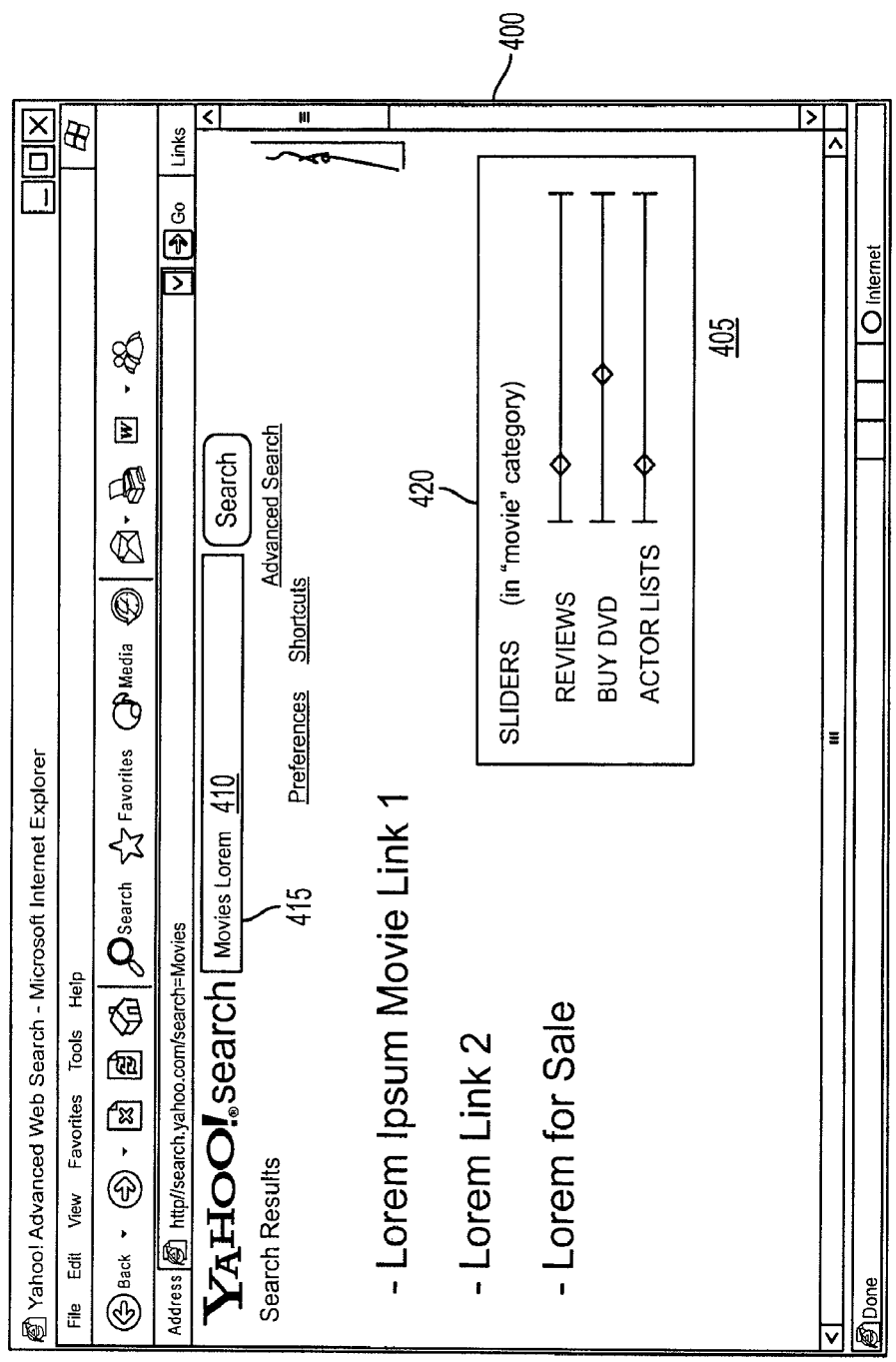
FIG. 4 is an illustration of a browser window that includes a search page configured to receive present parameter-based sliders and receive user values for those parameters.

FIG. 4 is an illustration of a browser window 400 that includes a search page 405 configured to receive present parameter-based sliders and receive user values for those parameters. Search page 405 is shown for exemplary purposes and may be alternatively configured as will be readily understood by those of skill in the art. Therefore, the exemplary embodiment should not be viewed as limiting the invention as specified by the claims. The search page might be a Yahoo! search page or other search page, and might be formatted as an HTML page, an XML page or the like. The search page might be served to the client system by the HTTP server, which might be a Yahoo! property server or the like.

The search page may include a field window 410 that is configured to receive query information 415 in the form of a query string (e.g., text), image data (e.g., graphical images, such as video or the like), audio data, a link that points to a page (such as a Web page on the Web) or the like. The query string might be entered in the field window by a user operating the client system. For example, a user might enter the query string "movies Lorem Ipsum" in field window 410 as shown in FIG. 4 or may enter any other query string the user desires information for.

According to one embodiment, search page 405 includes a slider panel 420 that allows a user to adjust sliders that correspond to weights for subconcepts deemed relevant to this search by the search engine. The names of the parameters shown in FIG. 4 are shown for exemplary purposes. Sort logic 216 is configured to use the user-supplied parameter values to reorder search results.

Other parameter values, shown or unshown, might include information extracted from a user query history on the client system, or stored server-side in a user profile database or the like. The user query history may include query information of one or more user queries issued by the user via his or her client system. The user query history may include the query string of each query issued by the user. The user query history may be retrieved by the search engine analysis to determine whether use the user query history to affect the search. The user query history may be accumulated by one or more of the search filter, the browser program, the filter records editor, one or more of servers $40_1$ to $40_N$, a dedicated program configured to operate on the client system, or the like.

In reordering search hits, some hits might be deleted or just ordered lower in the order.

It is to be understood that the examples and embodiments described above are for illustrative purposes only and that various modifications or changes in light thereof will be suggested to persons skilled in the art and are to be included within the spirit and purview of this application and scope of the appended claims. For example, sorting and reordering methods described herein might be combined with filtering techniques or other techniques. Therefore, the above description should not be taken as limiting the scope of the invention as defined by the claims.

What is claimed:

1. A method, implemented on a machine having at least one processor, storage, and a communication platform connected to a network for presenting a search result, comprising:

receiving, from a user device, a search term;

determining search results based on the search term, wherein each search result is associated with a topic;

determining a plurality of parameters and one or more query suggestions based on the topics associated with the search results, wherein each parameter from the plurality of parameters is defined by a predetermined range of numerical values, and each query suggestion is a word;

providing the plurality of parameters and one or more query suggestions to the user device;

receiving, from the user device, a user-selected option from the one or more query suggestions;

receiving, from the user device, a user-selected value from the range of values for each parameter from the plurality of parameters; and reordering the search results using the user-selected option and the user-selected values comprising listing relevant search results ahead of less relevant search results; and wherein the query suggestions are based on categorization of the search term and on trend analysis of tasks previously performed by one or more other users at web pales related to the categorization.

2. The method of claim 1, wherein the reordering further comprises deleting one or more of the search results.

3. The method of claim 1, further comprising:

indexing each document of a corpus;

scanning the each document as it is indexed to identify page elements.

4. The method of claim 3, wherein the query suggestions and the plurality of parameters are based on the page elements present in documents, which are comprised in the search results, and on categorization of the documents.

5. The method of claim 1, wherein the plurality of parameters are further determined based on a type of content associated with each of the search results.

6. The method of claim 1, wherein the plurality of parameters are further determined based on context associated with each of the search results, the context including a time of day and location of the user device.

7. The method of claim 1, wherein the plurality of parameters are further determined based on sub-concepts of concepts identified from the search results.

8. The method of claim 1, wherein the plurality of parameters are further determined based on information extracted from the user's query history.

9. A system comprising a server coupled to a user device over a communication network, the server comprising a search engine operable therewith at least to:

receive, from a user device, a search term;

determine search results based on the search term, wherein each search result is associated with a topic;

determine a plurality of parameters and one or more query suggestions based on the topics associated with the search results, wherein each parameter from the plurality of parameters is defined by a predetermined range of numerical values, and each query suggestion is a word;

provide the plurality of parameters and one or more query suggestions to the user device;

receive, from the user device, a user-selected from the one or more query suggestions;

receive, from the user device, a user-selected value from the range of values for each parameter from the plurality of parameters; and reorder the search results using the user-selected option and the user-selected values comprising listing relevant search results ahead of less relevant search results; and wherein the query suggestions are based on categorization of the search term and on trend analysis of tasks previously performed by one or more other users at web pages related to the categorization.

10. The system of claim 9, wherein the reordering further comprises deleting one or more of the search results.

11. The system of claim 9, wherein the search engine is further operable to:

index each document of a corpus;

scan the each document as it is indexed to identify page elements.

12. The system of claim 11, wherein the query suggestions and the plurality of parameters are based on the page elements present in documents, which are comprised in the search results, and on categorization of the documents.

13. The system of claim 9, wherein the plurality of parameters are further determined based on a type of content associated with each of the search results.

14. The system of claim 9, wherein the plurality of parameters are further determined based on context associated with each of the search results, the context including a time of day and location of the user device.

15. The system of claim 9, wherein the plurality of parameters are further determined based on sub-concepts of concepts identified from the search results.

16. The system of claim 9, wherein the plurality of parameters are further determined based on information extracted from the user's query history.

* * * * *